April 23, 1929.  A. F. ZAHM  1,710,135
AERODYNAMIC BALANCE
Filed April 18, 1922    15 Sheets-Sheet 3
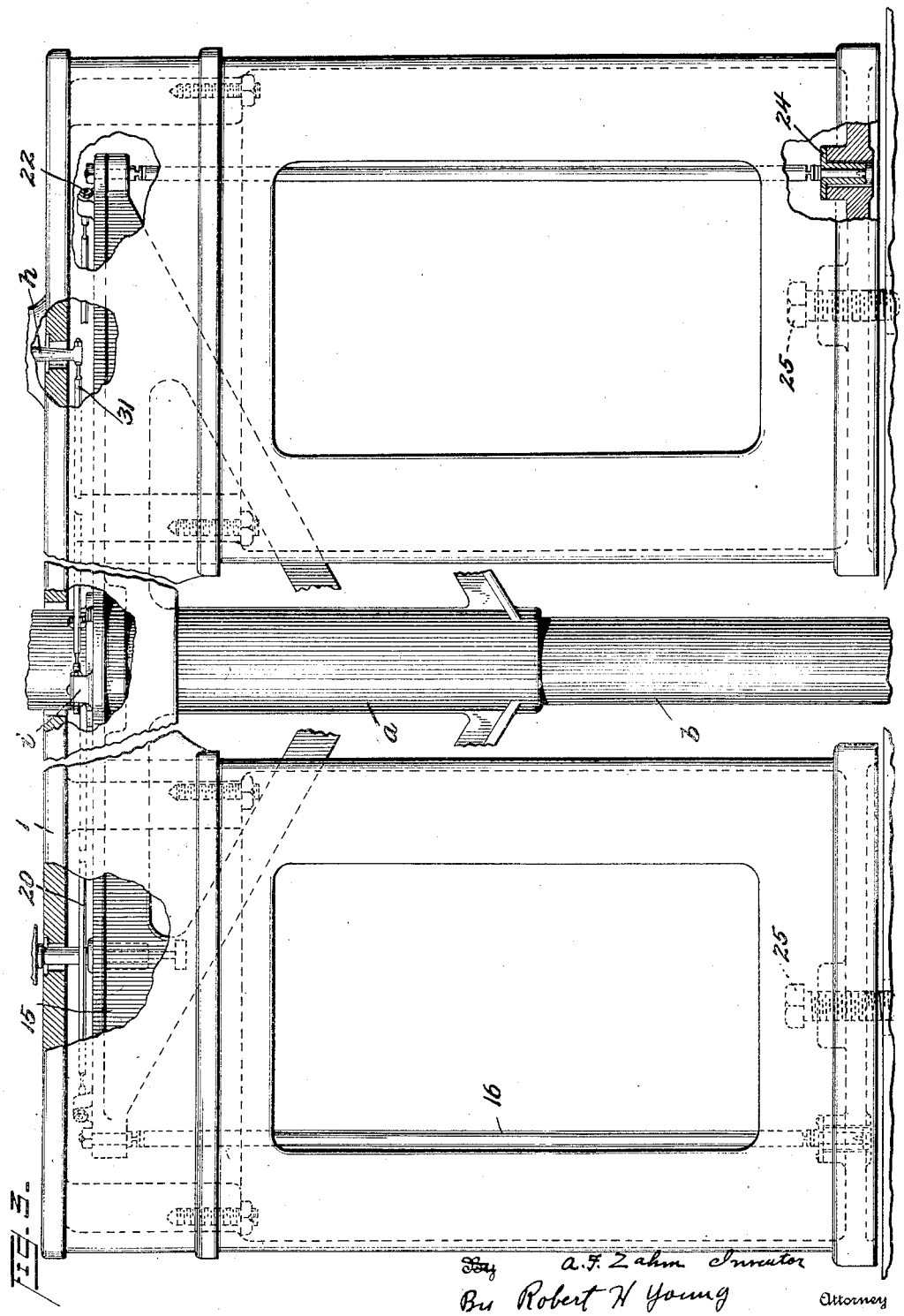

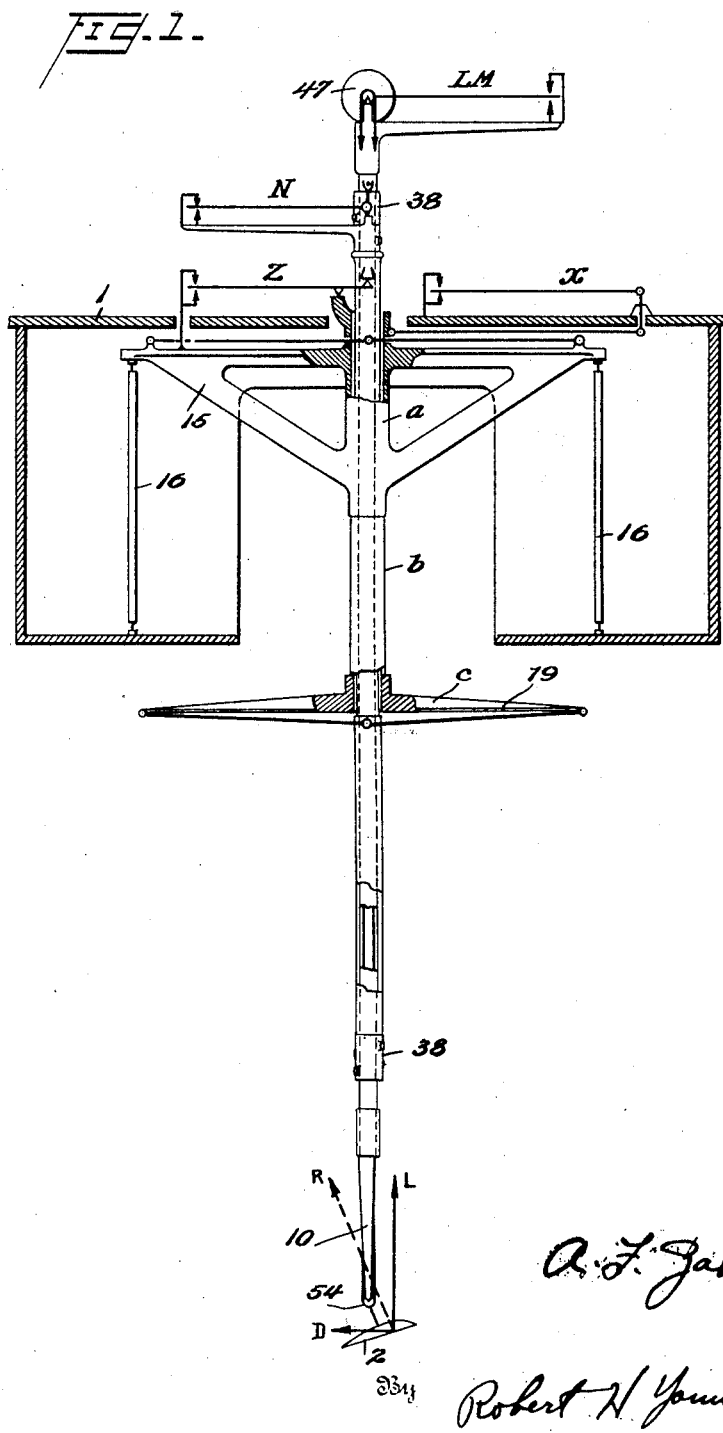

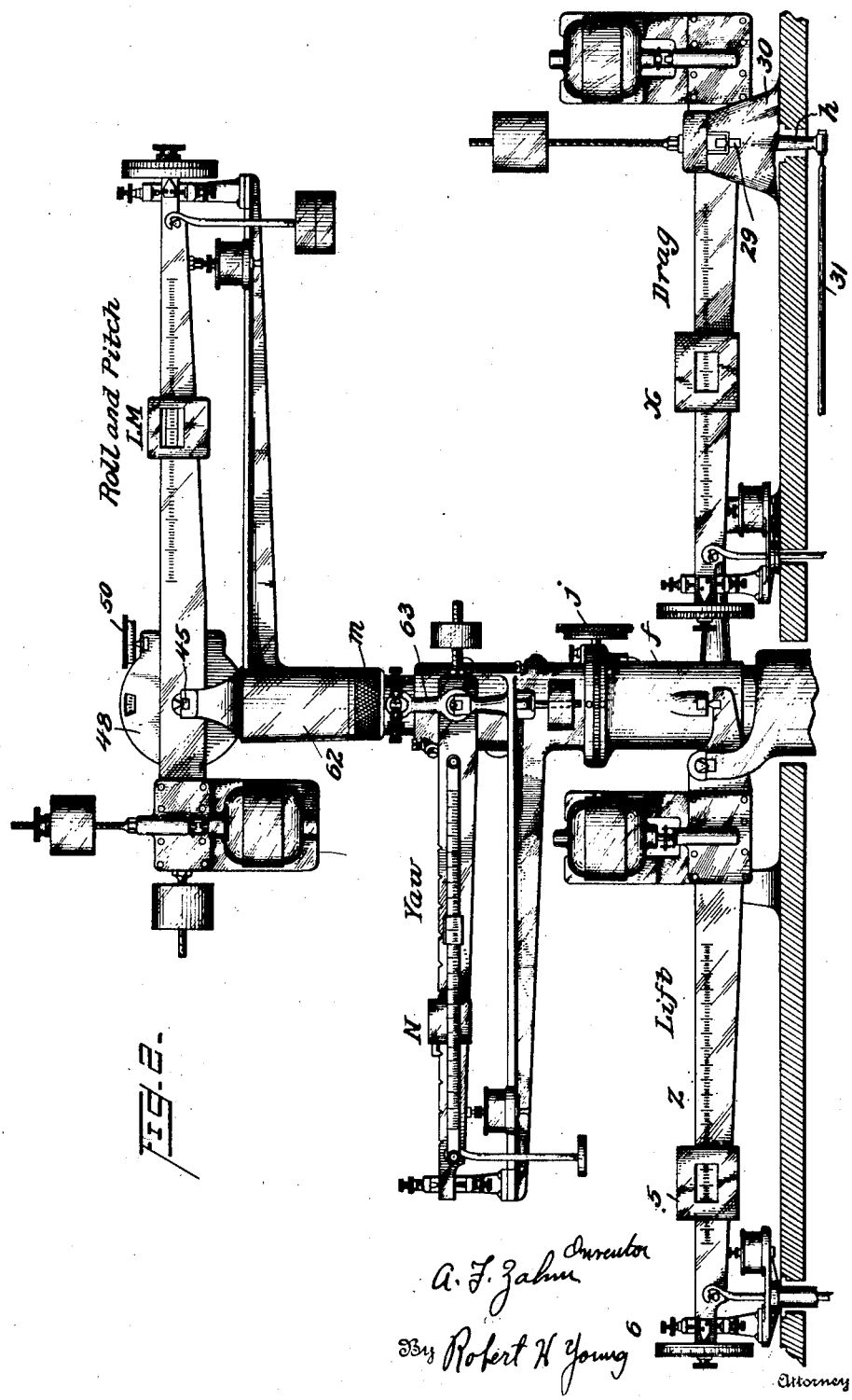

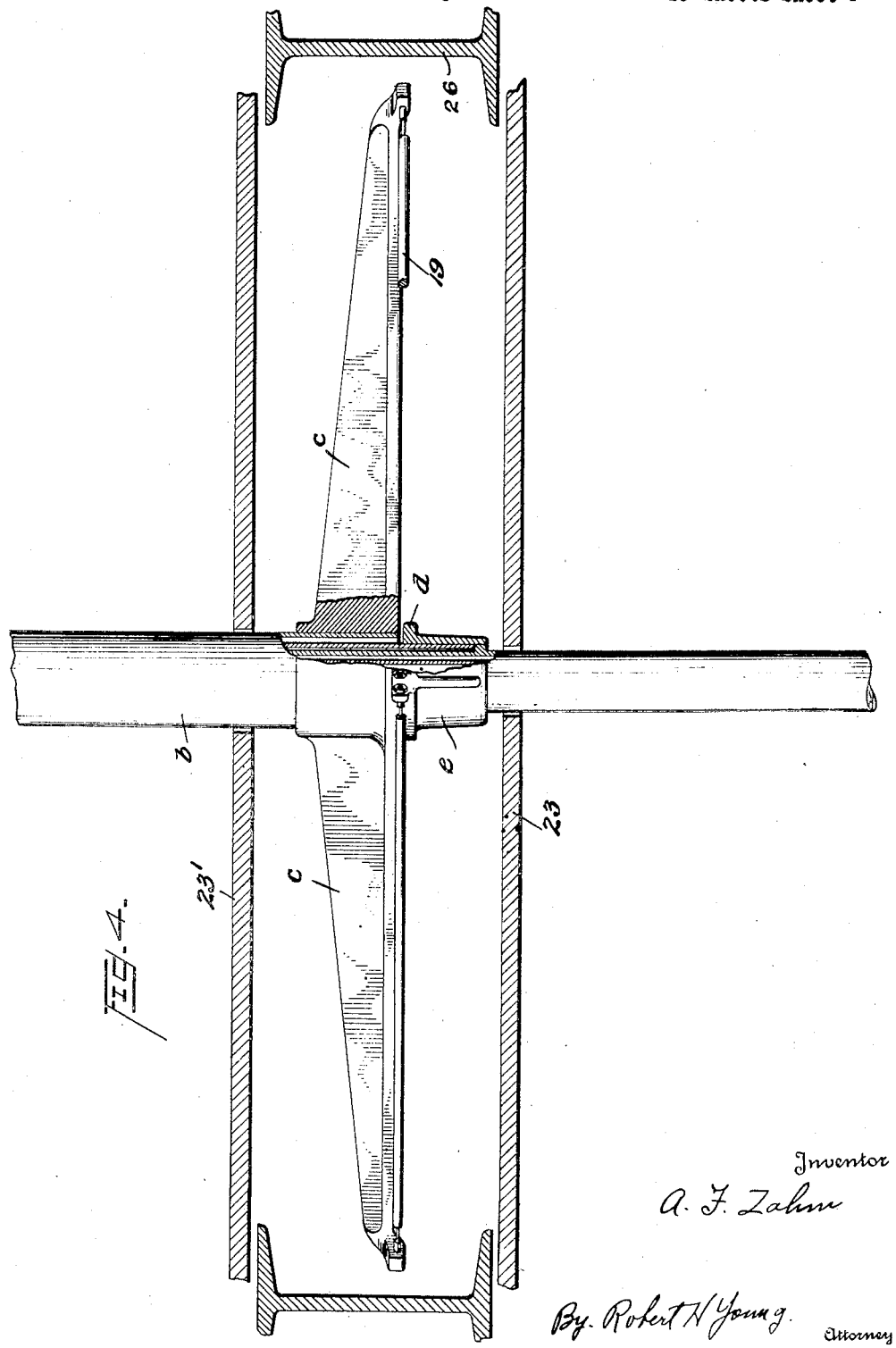

April 23, 1929. A. F. ZAHM 1,710,135
AERODYNAMIC BALANCE
Filed April 18, 1922 15 Sheets-Sheet 5
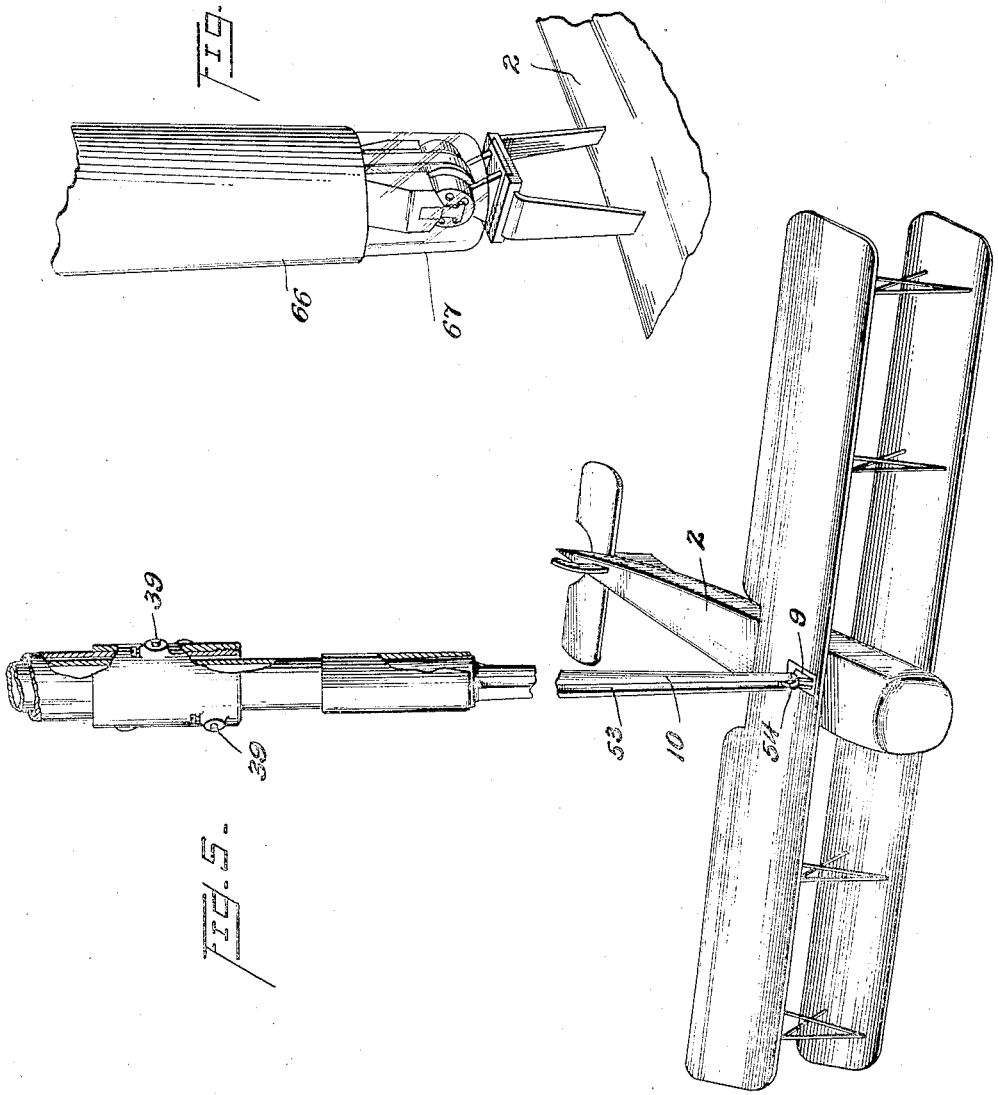

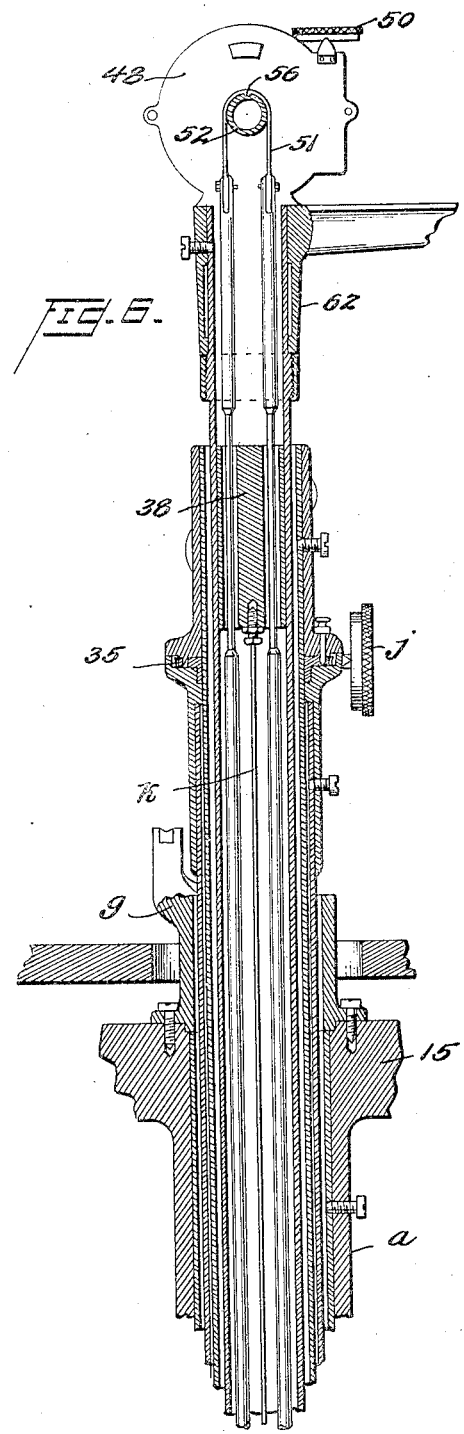
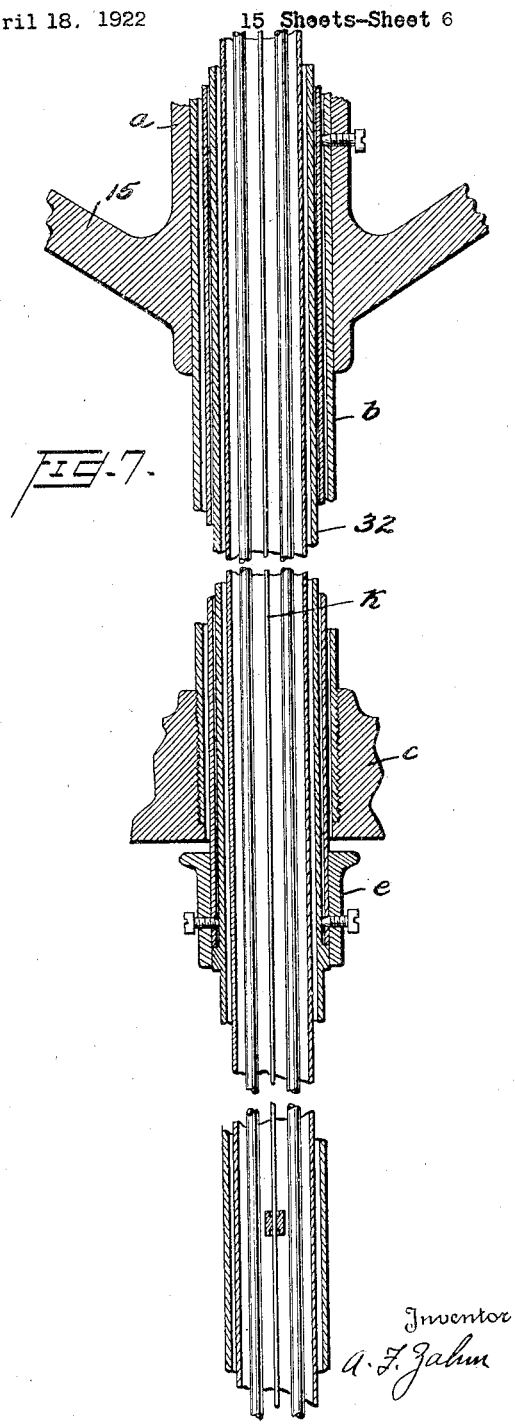

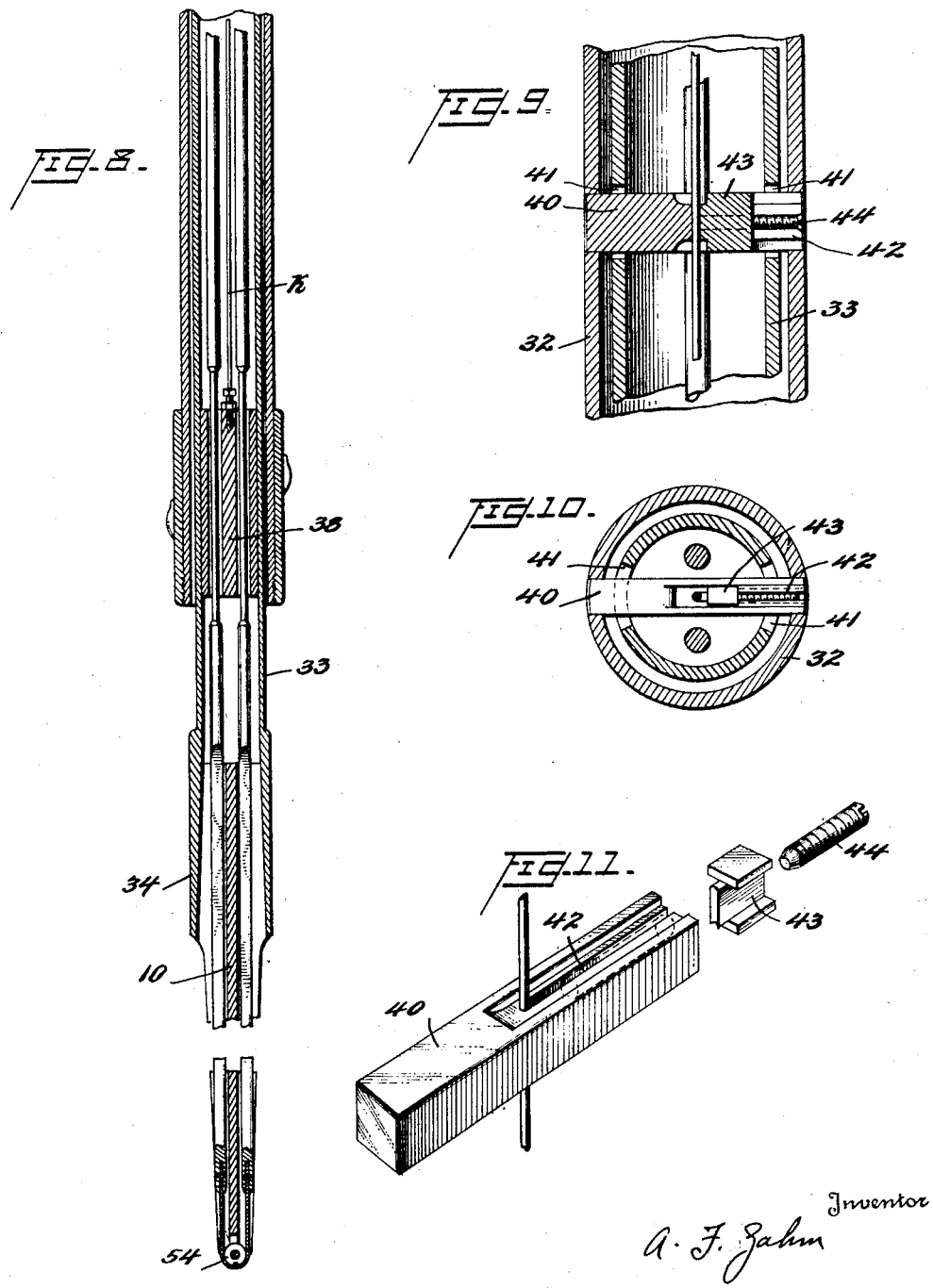

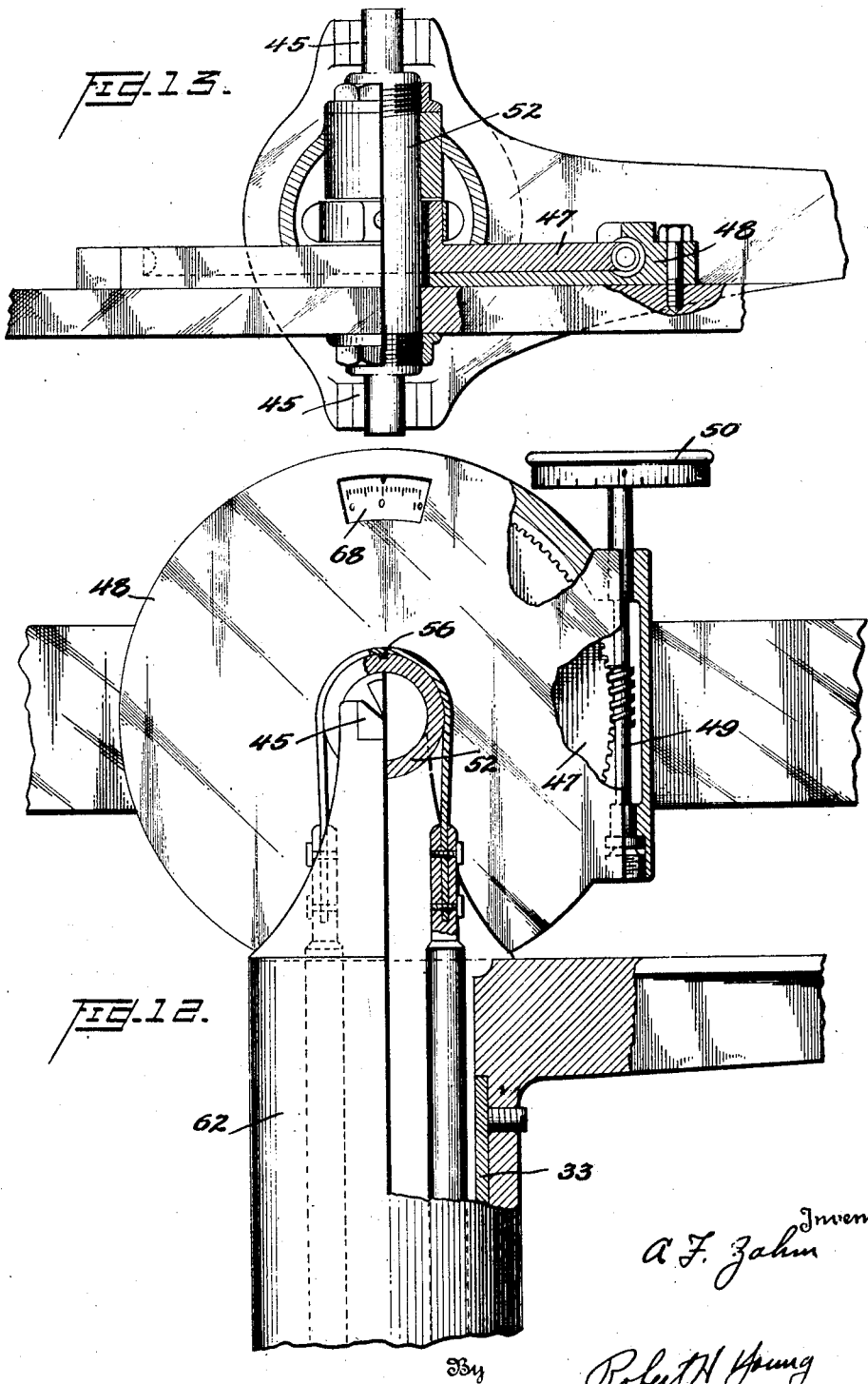

April 23, 1929.　　A. F. ZAHM　　1,710,135
AERODYNAMIC BALANCE
Filed April 18, 1922　　15 Sheets-Sheet 9
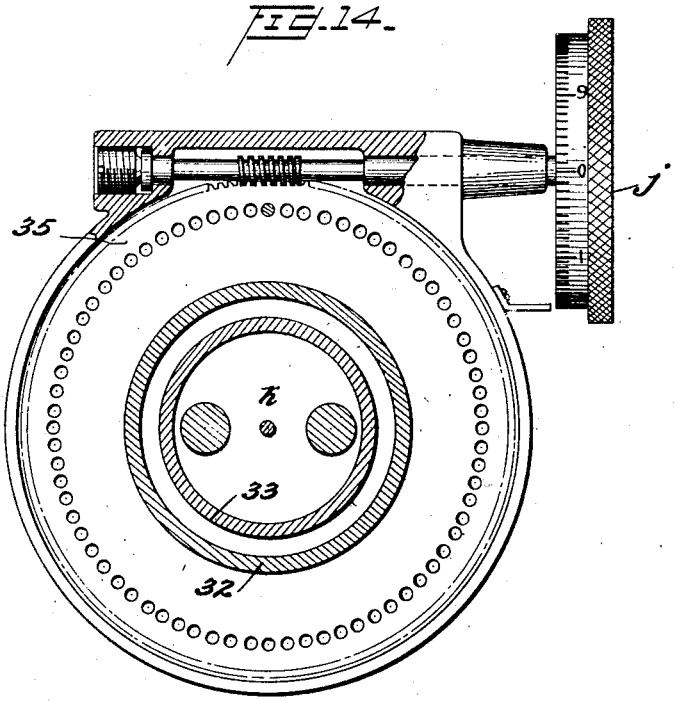
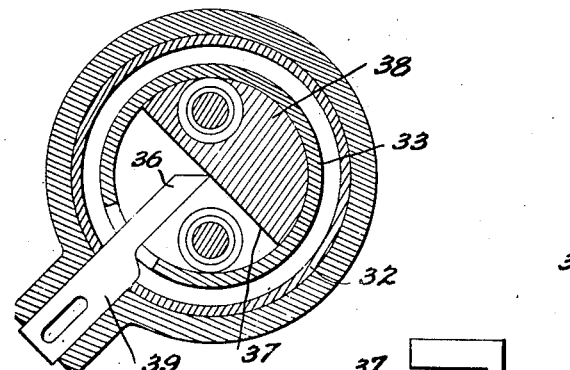
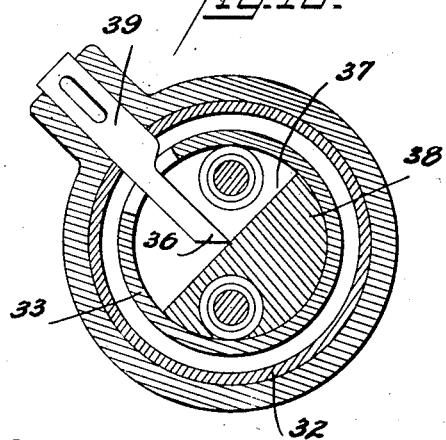
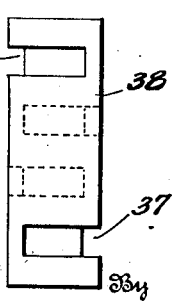
Inventor
A. F. Zahm
By
Robert H. Young
Attorney

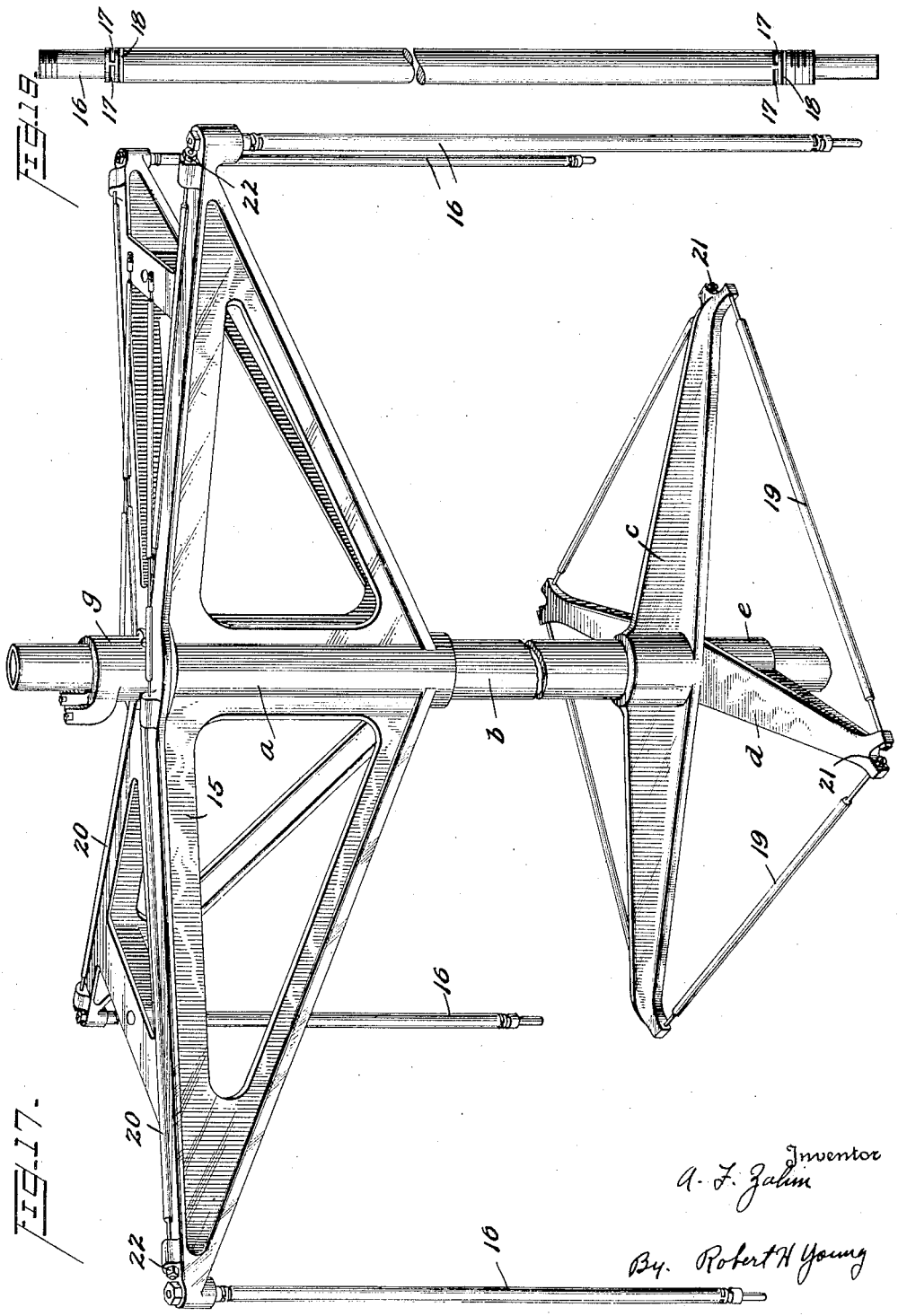

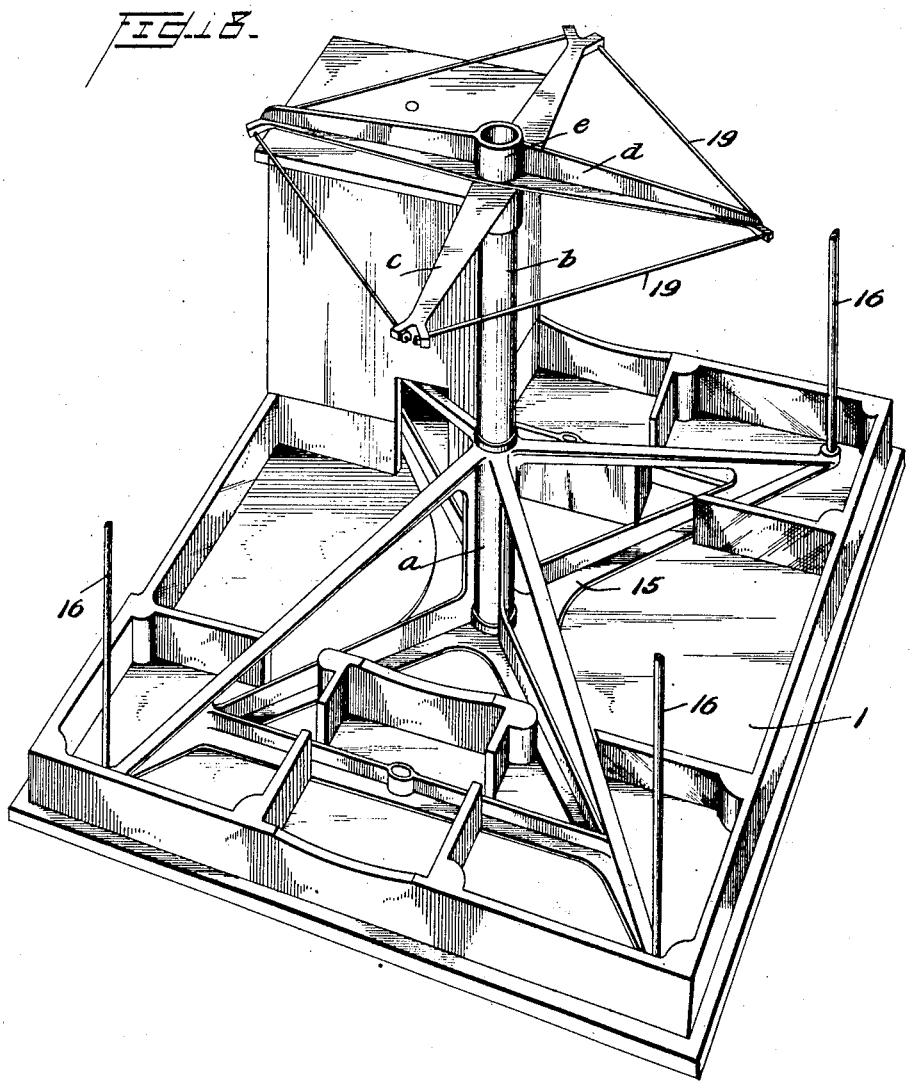

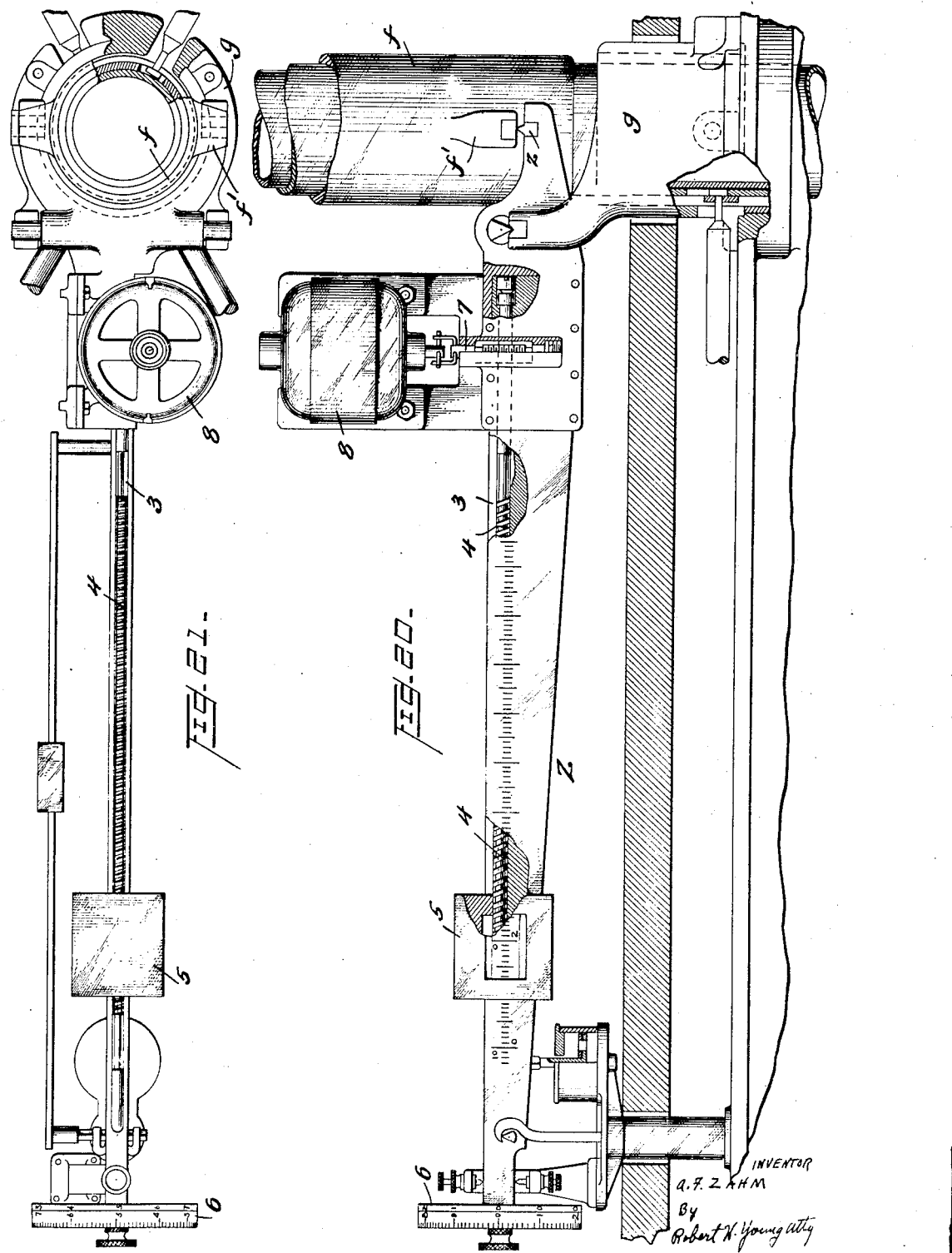

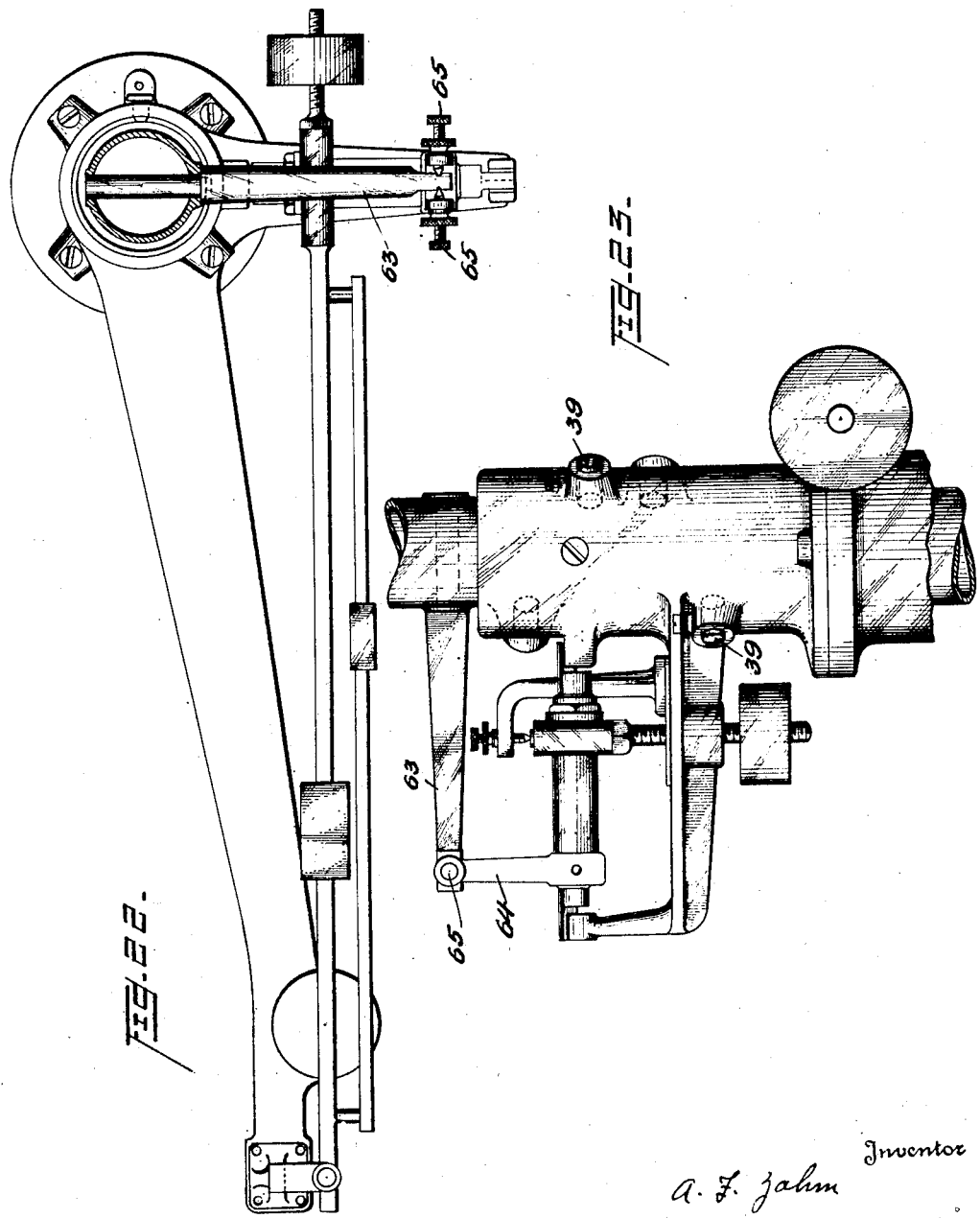

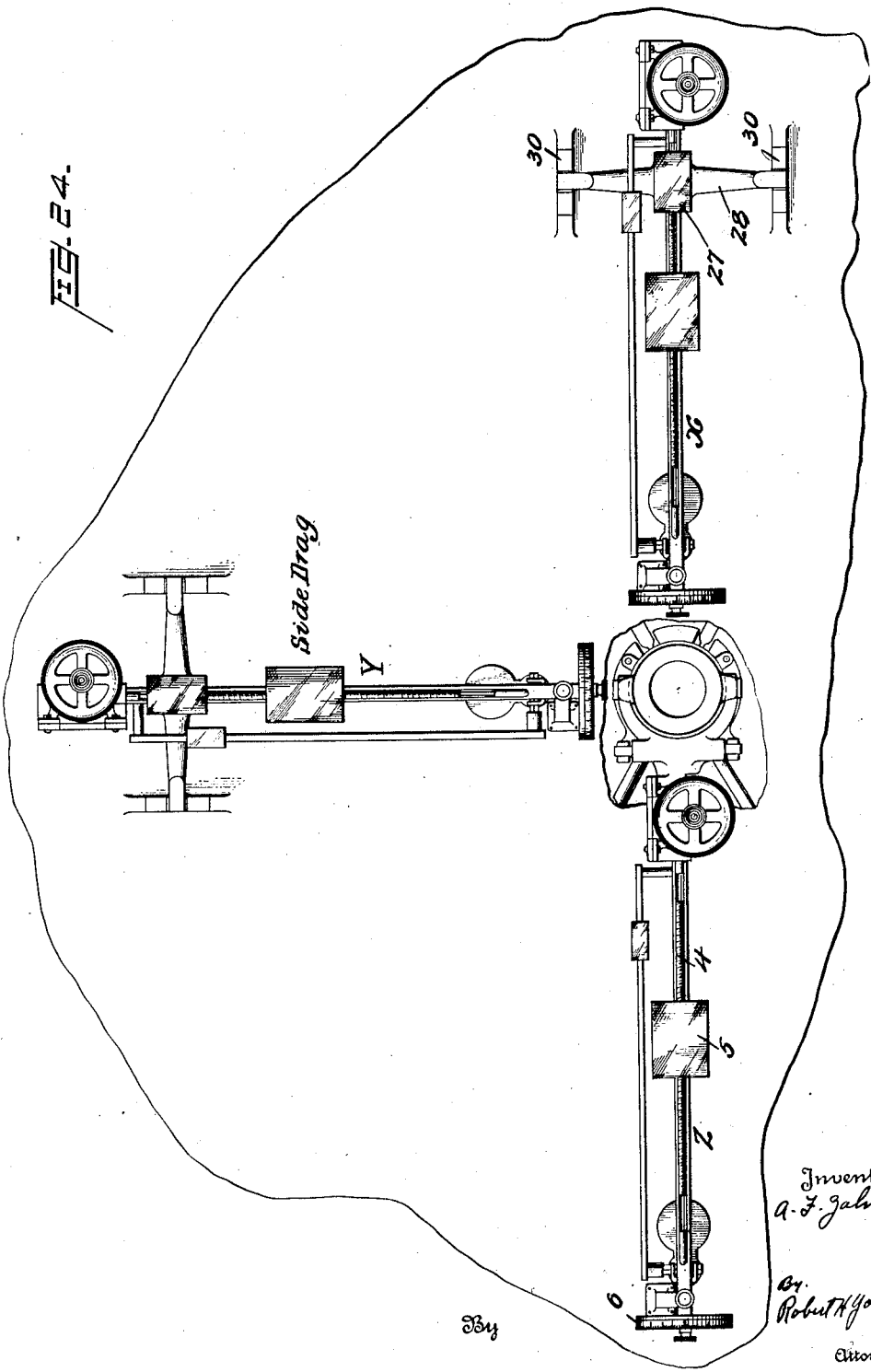

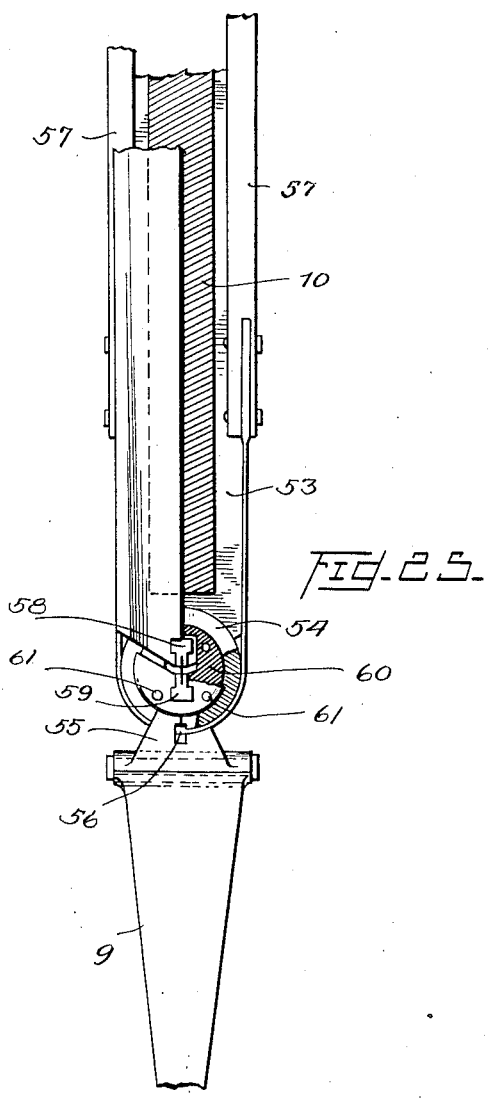
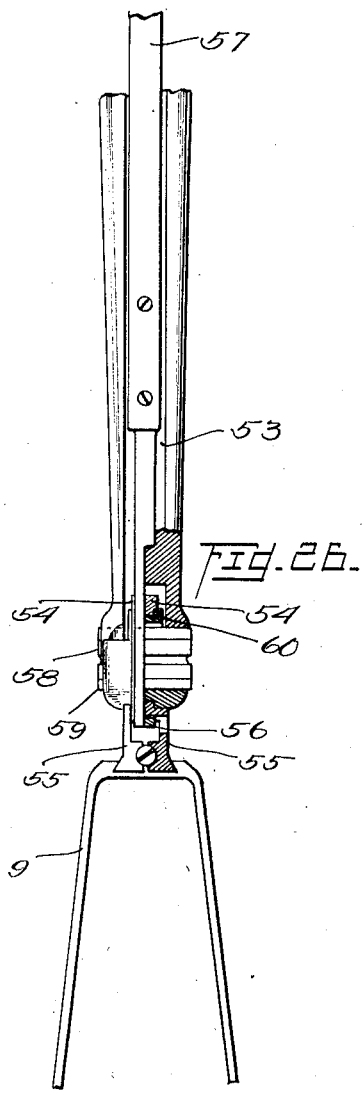
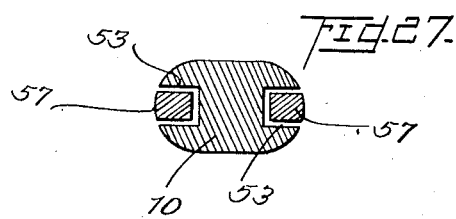

Patented Apr. 23, 1929.

1,710,135

UNITED STATES PATENT OFFICE.

ALBERT F. ZAHM, OF WASHINGTON, DISTRICT OF COLUMBIA.

AERODYNAMIC BALANCE.

Application filed April 18, 1922. Serial No. 554,793.

The object of this invention is to produce an aerodynamic balance capable of rapid and accurate measurement, in three dimensions, of the air forces and moments on a model. In the embodiment of the invention hereinafter described in detail, the measuring apparatus is situated in an observation room just over the wind tunnel in which the model is placed. The model is supported at or near its centroid, by means of a holder joining it to the bottom of a single vertical shank extending from midstream upwardly through a streamlined windshield to the main part of the balance in the observation room above.

By convenient mechanism at his desk, the observer is able (1) to set the model quickly and accurately in roll, pitch and yaw, without stopping the wind or air flow in the tunnel;
(2) to measure directly and independently the drag, side drag and lift; also the rolling, pitching and yawing moments; (3) to utilize automatic and self-recording devices for indicating the magnitude of these six components; also devices for slowly and continuously varying the incidence in roll, pitch and yaw; (4) to permit regulated oscillations of the model in roll, pitch and yaw, for determining its damping coefficients. The holder, fastened to the model before entering the wind tunnel, is capable of prompt attachment to the shank inside the tunnel, without disturbing the natural flow about the model, and is also capable of prompt removal.

The invention consists in the construction, combination and arrangement herein fully described, illustrated and claimed.

In the accompanying drawings:

Figure 1, is a view, partly in elevation and partly in section, of the complete apparatus, omitting details.

Figure 2, is an enlarged elevation of the measuring instrumentalities in the observation room, showing the top of the desk in vertical section.

Figure 3, is an enlarged elevation, partly in section, of the desk in the observation room, showing a portion of the central column and the translation mechanism.

Figure 4, is a vertical section through the floor of the observation room and the ceiling of the wind tunnel, showing another portion of the central column and the cross arm of the translation mechanism.

Figure 5, is a perspective view, partly broken away, of the lowermost portion of the central column, showing a model airplane attached to the shank of the balance.

Figure 5ª, is an enlarged view showing the wind shield.

Figure 6, is an enlarged vertical section through the uppermost portion of the central column.

Figure 7, is a similar view of the next lower portion of the same column.

Figure 8, is a similar view of the lowermost portion of the same column.

Figure 9, is an enlarged fragmentary vertical section through the yaw pipe and center pipe of the central column showing the means of anchoring the wire which supports the center pipe.

Figure 10, is a cross section through the same.

Figure 11, is an enlarged perspective view of the anchoring means shown in Figures 9 and 10.

Figure 12, is an enlarged view, partly in elevation and partly in section, showing a portion of the pitch belt, and the operating means therefor on the upper end of the center pipe.

Figure 13, is top plan view, partly in section, of the same.

Figure 14, is an enlarged horizontal section through yaw pipe and center pipe, showing the means for rotating the yaw pipe.

Figures 15 and 16, are horizontal sections through the center pipe and yaw pipe, taken at different elevations in the same vicinity, showing the means for preventing translation of the center pipe across the yaw pipe.

Figure 16ª, is a detail view of the plug shown in Figures 15 and 16.

Figure 17, is a perspective view of the translation structure or floating support.

Figure 18, is an inverted perspective view of the same showing.

Figure 19, is an enlarged elevation of one of the vertical elastic supporting posts of the translation structure.

Figure 20, is a view, partly in elevation and partly in section of the left beam and parts adjacent thereto.

Figure 21, is a top plan view of the same with parts in section.

Figure 22, is a plan view of the yaw beam, showing the yaw pipe in section.

Figure 23, is an elevation of the same taken at a right angle to Figure 22.

Figure 24, is a plan view showing the relative arrangement of the weighing beams.

Figure 25 is a side elevation partly in section of my model holding device. Figure 26 is a front elevation partly in section of the device shown in Figure 25. Figure 27 is a cross section through the shank of my model holding device.

*General description of the balance.*

Above the top 1 of an all metal desk which serves as a base are shown three individual weighing beams X, Y and Z for respectively measuring drag, side drag and lift; a weighing beam N for yaw; and a single weighing beam L, M, for roll and pitch, the last named beam being set across stream for roll, and along stream for pitch. When the model 2 sets normally, the six components X, Y, Z, L, M, N, are square with the wind tunnel; when the model yaws, L and M turn with the model, the others remaining fixed. The mechanism through which the air force actuates these beams, and the means for setting the model in roll, pitch and yaw will be described later.

The components X, Y, Z, L, M, N of the air wrench on the model, are weighed directly and independently. All but one of the weighing beams are motor operated and practically identical in design. While the yaw beam motor has been omitted for convenience, it is to be understood that it is to be installed. Except for one case each weighing can be made without disturbing any of the others. The pitch motor, when accelerating, can disturb the yaw motor weighing which it could not do if mounted with its axis horizontal, say parallel to the pitch beam. Each motor is mounted with its shaft normal to the supporting knife edge of the weighing beam, to avoid making the latter kick when the armature accelerates.

The drag and side drag beams are supported on elastic, the others on plain knife edges. The elastic kind would be preferable in all cases to insure against sliding or creeping; they are always clean, and are virtually frictionless for the extremely small distortions—less than .01°—they sustain in practice.

A description of one automatic weighing beam will serve for all. Consider, for example, the lift beam Z, Figure 2. Along a groove 3 in the top of the beam extends an accurate lead screw 4 which propels a sliding weight 5, without backlash, and bears at its far end a micrometer disk 6, its other end being connected by worm gearing to the shaft 7 of a small motor 8 with double wound field. This motor rides on the beam and drives the lead screw 4. The beam vibrates a thousandth of an inch each way at its tip, between tungsten electric stops so connected as to run the motor forward with upper contact, backward with lower contact, and not at all without contact. Usually a 110 volt D. C. line wire feeds the motor, which is of .005 H. P.

The gearing and graduations are decimal. Each rotation of the motor moves the screw 4 through .01 of a turn, and advances the sliding weight .001″. The advance of the sliding weight, through its possible range of 10″ is indicated in inches and tenths by the scale on the beam; in hundredths and thousandths by the scale on the micrometer disk 6, which latter has one hundred small divisions .1″ apart. On all of the force beams the graduations and sliding weights are so dimensioned as to indicate air forces in pounds and decimals to one thousandth; on the other beams air moments are indicated in pound inches and decimals to one thousandth. Each weighing beam is provided with a scale pan, tare, counterweights, both sliding and threaded as shown, and an oil damping cup with adjustable diaphragm. The mass of the sliding weight is optional; usually it moves 1″ to weigh on pound or pound-inch. In these units, weighing up to 10 lbs. by increments of .001 are made automatically.

In Figures 5 and 5ᵃ is shown a fork-like holder with two prongs 9 for supporting the model 2. As shown in Figure 5ᵃ a streamline wind shield 66 is provided the same having a transparent lower portion 67 to disclose the pivot of the lower pulley 54. (See Figures 25 and 26.) The overhead mechanism for adjusting the model holder in roll, pitch and yaw and for transmitting to the weighing beams the six components X, Y, C, L, M, N of the air wrench on the model will now be explained.

*Translation mechanism.*

Since the lift, drag and side force are to be measured each directly and independently of the others, the rigid framework which carries the model bearing shank must be capable of some slight translation parallel to each of these forces. Figure 17 delineates the chief external parts of this translation mechanism. As shown, a skeleton rectangular inverted pyramid 15 of metal, as aluminum, is supported at its four outer corners by and upon four elastic vertical corner posts 16, which permit it to shift freely along and across stream; also to rotate in yaw unless restrained. Inside of the long vertical core $a$ of this "floating pyramid" is driven a steel extension pipe $b$, which might as well be a part of the same casting. The pyramid, the pipe $b$ and a cross arm $c$ firmly fixed to the lower end of the pipe $b$ form a single rigid body having, when unrestrained, three degrees of freedom in a level plane. The four supporting posts 16 are thick drill rods nearly sawed off adjacent to top and bottom to make them elastic. This is best shown in Figure 19, in which appear saw kerfs 17 and 18, the kerfs 17 being made in opposite sides of the post so as to leave a thin diametrical web, and the other kerfs 18, closely adjacent thereto, being cut at a right angle to the kerfs 17 to leave a similar diametrical web; the two webs thus formed being normal to each other.

Inside the floating pipe $b$ is a coaxial lift pipe $e$, slightly longer and guided in vertical translation by four taut horizontal elastic rods 19 at its bottom, and four similar rods 20 at its top. The four top guide rods 20 are anchored to the outer corners of the pyramid, and extend normally into the walls of the lift pipe to which they cling by their heads like bicycle wheel spokes. The four bottom rods 19 join the extremities of the floating pipe cross arm $c$ to the extremities of a similar cross arm $d$ firmly fixed to the bottom of the lift pipe. All of these elastic guide rods, which must have the same coefficient of expansion as the castings, are held taut and horizontal by tension nuts 21 and 22 so as to guide the lift pipe $e$ without supporting it.

To support the lift pipe $e$, a casting $f$ (Figure 20) is fixed to its top, with lugs $f'$ on opposite sides thereof resting upon knife edges $x$ on the inner end of the lift beam Z. The fulcrum for the lift beam is a forked casting $g$ which forms the top center or head of the pyramid. The lift pipe which extends downwardly to, but does not penetrate, the wind tunnel roof 23, (Figure 4) supports in turn the firm model-bearing shank 10, through intermediate mechanism to be described under the caption, "Rotation mechanism".

The whole translation structure, just described, floats within the desk 1 and has its posts 16 securely planted on laterally shiftable pedestals 24 screwed to the bottom of the four desk columns. These columns have each a leveling screw 25 resting on a secure foundation bridge 26 (shown as an I beam) just above the wind tunnel ceiling 23, and under the laboratory floor 23'—(Fig. 4).

*Measurement of lift, drag and side drag.*

As already explained, the lift is measured with a simple weighing beam like a steelyard. The outer tip of the lift beam, when alternately knocking against the electric stops, plays about one thousandth of an inch above and below its mean position. The lift pipe, resting on its other end, rises and falls about one nine thousandth of an inch, carrying with it the mechanism supporting the shank 10 and model 2. When in free balance, the lift pipe vibrates up and down hundreds of times before coming to rest, though it must slightly flex, at their two end necks, all of the elastic guide rods. For all practical purposes the motion is perfectly frictionless.

The drag is measured with a bell-crank 27 whose axle 28 is supported on two elastic knife edges 29 set into two cast pillow blocks 30, (Figs. 2, 3 and 24). From this axle two arms $h$, near its ends, extend downwardly through the desk top and connect with two long pull rods tensional parallel to the wind and anchored, on opposite sides of the lift pipe axis, to anchor lugs $i$ cast on top of the floating pyramid, (Fig. 3). These rods prevent yawing of the pyramid, without restraining it across stream, and allow it to move along stream one five-thousandth of an inch when the tip of the drag beam kicks a thousandth.

The side drag is measured by the beam Y, Fig. 24, with the aid of another bell-crank system identical with the drag beam system except that it has but one arm, corresponding with arm $h$ of Fig. 3, and one pull rod, corresponding with rod 31 of Fig. 3, said rod extending horizontally across the wind direction to an anchor lug on the floating pyramid adjacent to its center.

In both drag mechanisms top heaviness of the floating system is obviated by the elasticity of the four initially vertical supporting posts, which overcomes the tendency of gravity to cause translation along and across stream when the posts bend however slightly. Furthermore the vertically-moving counterweights could be made to modulate any such tendency, if it existed.

*Rotation mechanism.*

Inside of the lift pipe is the close-fitting rotatable yaw pipe 32 which projects a little above it and well below it, extending to within about eighteen inches of the center of the wind tunnel. Inside the yaw pipe the center pipe 33 is rotatable without friction and projects above it and below it. The lower end of the center pipe is formed to provide a conical or tapered stock 34 which holds, as a drill spindle holds a drill, the rugged tapering shank 10 which supports the model 2 in the airstream in the wind tunnel. The yaw pipe, when rotated in its plain friction bearings, by means of its encircling worm wheel 35, actuated by micrometer disk $j$ (Fig. 14) sets the center pipe and all it carries at any desired angle of yaw truly to .01°. The yaw pipe also stiffens the center pipe, supports it in frictionless bearings and carries the beam N for weighing the yaw torque exerted on it by the wind force on the model.

The center pipe, when not rotationally restrained by its yaw lever, can oscillate many degrees within the yaw pipe which latter in turn carries it along and across stream a fraction of a thousandth of an inch, borne itself by the lift pipe and floating system. In order to prevent translation of the center pipe across the yaw pipe, four knife edges 36, carried by the yaw pipe bear against four separate diametrical facets 37 of a ground steel plug 38, two of such facets being shown in Figs. 15 and 16 and the whole plug being shown in Fig. 16ᵃ. The plug 38 is situated in the center pipe 33 near the bottom thereof and a like system is used near the top to prevent translation of the center pipe across the yaw pipe 32. The yaw pipe carries, adjacent to its top and bottom, four radial bars 39, the inner ends of which are formed into the knife edges 36. The center pipe is additionally supported by a steel wire $k$ extending axially of the center pipe from the upper to the lower plug and firmly fixed in a bridge bar 40 (Figs. 9, 10 and 11) set diametrically across the yaw pipe 32 and through slots 41 of ample size in the center pipe 33. The bridge bar 40 has a slot 42 extending about one half the length thereof and open at one end of the bar to admit the wire K. A flanged clamp 43 is inserted in the slot 42 and held in clamping engagement with the clamp 42 by a screw 44 having a threaded engagement with the bridge bar. With reference to the yaw pipe, therefore, the center pipe can have no motion but axial rotation, and this without perceptible friction or elastic resistance.

At the extreme top of the center pipe are knife edge seats 45 (Fig. 2) supporting the axle 46 of the pitch (and roll) beam M. On this axle is a worm wheel 47 (Figs. 12 and 13) encased in a housing 48 fixed to said axle and pitch beam, the worm wheel being free to turn around the axle. The worm wheel is turned by means of a worm shaft 49 journaled in the housing 48 and operated by a micrometer disk 50. A steel belt 51 passing around the hub 52 of the worm wheel 47, extends without perceptible contact or friction down through large holes in the plugs 38, (Figs. 15 and 16) inside of the center pipe, thence through channels 53 in the fore and aft edges of the shank 10 and passes around a frictionless pulley 54, (Figs. 25, 26 and 27) having a downreaching flange 55 supporting the streamline fork 9 holding the model 2 (Fig. 5). The belt has two teeth 56, one to engage the pulley 54 and one to engage the hub 52, to prevent creeping of the belt, and the straight portions 57 are preferably thickened sufficiently to prevent material stretching. This belt system can, with the wind on, be made to set the model to any desired pitch angle truly to 0.01°, while still remaining in ready condition to measure the pitching moment.

Firmly set into the bottom tip of the shank 10 is the top lobe 58 of an elastic knife edge, the bottom lobe 59 of which can rotate flexibly about the elastic axis two or three degrees in pitch positive and negative. The bottom lobe is embedded in a peripherally grooved disk 60 which rotates with it until limited by buffer pegs or stops 61 in the tip of the shank. Encircling this disk and coaxial with it is the lower belt pulley just described, which is free to turn around said disk.

Now suppose that initially the elastic knife edge is in its unstrained position. When the belt moves, the pulley 54 at first turns integrally with the disk 60 and bottom lobe, then turns upon the disk after the latter bumps the stops. The pulley may continue, carrying the model through any desired pitch to 90°, still turning upon the disk 60 which rests against the stops. A definite small reversal of the belt now brings the bottom lobe 55 back to its unstrained position, and allows frictionless vibration of the pulley-belt-and-pitch-beam system, if its tares are adjusted. The stops 61 may be made adjustable on the disk 60 so as to lock the elastic knife edge during change of incidence, to prevent flexing, then release it for weighing.

In practice the knife edges and belts are amply free of friction and hysteresis, and together hold the model securely against all components of translation and rotation. The belts are kept suitably taut by turning the knurled ring nut M (Figs. 2 and 6) thereby elevating the head piece 62 and its knife seats 45 on the center pipe. In usual practice the stretch of the belt is negligible; in extreme loading the slight stretch is formed by previous calibration.

*Measurement of moments.*

The yawing moment of the model is transmitted through the center pipe and its yaw lever 63 (Fig. 22) to the forked crank arm 64 (Fig. 23) extending upwardly from the axle of the yaw weighing beam N. Adjusting screw 65 in the prongs of the arm 64 fit the tip of the yaw lever 63, truly to one thousandth of an inch, and transmit the moment to the yaw beam. The sliding of the weights by hand admits of true yaw measuring but disturbs the other weighings, a slight objection readily overcome by using a motor. Otherwise the yaw mechanism is satisfactory. The resistance of fifty pound yaw mechanism to rotational vibration has been found to be so slight that with no wind in the tunnel the center pipe would oscillate nearly half an hour before coming to rest from a slight displacement. The pitching and rolling moments also can be truly measured when the lower belt pulley 52 is well pivoted, and especially with the elastic knife edge.

*Smoothness of airstream below wind shield.*

The parts of the aerodynamic balance in the air current are protected from drag by an enveloping wind shield 66 (which may be streamlined) contracting in size toward the bottom where it carries a smaller transparent wind shield 67 permitting the mechanism at the bottom of the shank 10 to be inspected. These shields cause some deviation of the lines of air flow in their immediate vicinity; this however is immaterial two inches below the lower shield. The model is, therefore, always held well below the lower windshield disturbance where the air flow, determined with the shields in place, is found by explora-

Correction for model holder.

Protruding downwardly from the shielded shank 10 is the bifurcated model holder, the prongs 9 of which are each about one millimeter thick and well streamlined, especially where they join the surface of the model. Allowance for the wind effect on this holder must be made. The wind effort is measured first on the model and holder, then on the holder alone with the model detached from the holder but not removed from the wind tunnel or from proximity to the holder. In fact, the two are to be maintained in as nearly the same position they originally occupied as is possible without actual contact between them. The difference is the effort on the model alone; for the proximity of the prongs causes no material disturbance of the air flow past the model. To show this, dummy prongs were held near the model during measurement and were found not to affect the reading as they approached or receded. Each prong near the model can be shaped to have less than one fifth the resistance of a round wire one millimeter thick and of the same length.

Procedure of mounting and measuring.

Before the model is placed in the wind tunnel it is tested on the plane table micrometer to determine the degree of its conformance to the structural specifications. Then the pronged holder is attached to the model, usually near the "design" centroid, or point representing the centroid of the full scale structure, and commonly on the less cambered side of the model, such as the flat or concave side of an aerofoil or the bottom of an airplane body. When the wind test is to start, the dovetailed crown of the holder is slipped on the pulley flange 55 at the bottom of the shank 10, (Fig. 26). A light spirit level applied to the wing chord, or other reference line, serves to set the model at zero incidence. The reading of the pitch circle scale 68 at the top of the balance is then set to zero, and the counterweights are adjusted on all the weighing beams to be used. Unless a special counterpoise to the model itself be used for gravitational balance at all angles of pitch, static weighings with the pitch beam are made, with no wind, for some pitch positions of the model. These readings can be omitted if the gravity moment of the model about the supporting pivot has been previously determined for a known position of the centroid. The wind is then set at the fixed speed desired, and note is made of the elastic distortion of the model, if perceptible, due to the wind load at various incidences. The apparatus is now ready for regular readings.

More commonly but three of the six components of the wind wrench, viz,—the lift, drag and pitchment moment, are to be measured. The weighings are all made at once automatically and require each but a minute for a fixed poise and wind. Holding the wind steady the operator can give the model a new angle of incidence by turning the worm 49 and the wheel 47 bearing the pitch circle scale 68 and proceed with the weighings as before. Or the poise of the model can be held while the air speed is given various fixed values. Finally, the weighings are repeated with the model detached but not removed, as already explained. Thus, with the balance working normally, a complete set of weighings of lift, drag and pitching moment, for one air speed and sixteen angles of attack, can be made in less than half an hour. To accomplish as much with the old Eiffel balance required over eight hours and gave data involving eight hours in the drafting room to deduce and plot the final values.

The apparatus above described is adaptable to oscillation tests; and may also be provided with the more usual spindle holdings aerofoils by the end; or again may be used as a wire balance by an obvious modification of the lower portion of the concentric pipes.

The apparatus above described measures the wrench on the model. This includes the complete action of a force on a rigid body, or it designates the six actions (three moments and three forces) on the model.

What is claimed is:

1. In an aerodynamic balance embodying in combination, a model holding member adapted to hold a model in a relatively fixed pose in an air stream and weighing means connected with said model holding member automatically movable to measure the force exerted on the model by the air stream.

2. An aerodynamic balance embodying in combination, a model holding member adapted to hold a model in an air stream, and weighing means connected with said model holding member operating to measure the force exerted on the model by the air stream, said weighing means being automatically movable to indicate the balancing weights as the force on the model varies.

3. An aerodynamic balance embodying in combination, a model holding member adapted to hold a model in an air stream, and weighing means connected with said model holding member operating to measure the force exerted on the model by the air stream, said weighing means being electrically controlled and being automatically movable to indicate the balancing weights as the poise of the model is altered.

4. An aerodynamic balance embodying in combination, a model holding member adapted to hold a model in an air stream, and weighing means connected with said model holding member automatically movable to measure and indicate directly the lift force exerted on the model by the air stream.

5. An aerodynamic balance embodying in combination, a model holding member adapted to hold a model in an air stream, and weighing means connected with said model holding member automatically movable to measure and indicate directly the drag force exerted on the model by the air stream.

6. An aerodynamic balance embodying in combination, a model holding member adapted to hold a model in an air stream, and weighing means connected with said model holding member automatically movable to measure and indicate directly the side force drag or cross-wind force, exerted on the model by the air stream.

7. An aerodynamic balance embodying in combination, a model holding member adapted to hold a model in an air stream, and weighing means connected with said model holding member operating to measure simultaneously the pitching and yawing moments exerted on the model by the air stream, said model holding means being movable tridimensionally.

8. An aerodynamic balance embodying in combination, a model holding member adapted to hold a model in an air stream, and weighing means connected with said model holding member operating to measure simultaneously in two of the three moments, yawing, pitching and rolling as exerted on the model by the air stream, said model holding means being movable tridimensionally.

9. An aerodynamic balance embodying in combination, a model-holding member adapted to hold a model in an air stream, and weighing means connected with said model holding member operating to measure the rolling moment exerted on the model by the air stream, said model holding means being movable tridimensionally.

10. An aerodynamic balance embodying in combination, a model holding member adapted to hold a model in an air stream, and weighing means connected with said model holding member operating to measure independently or concurrently one or more moments exerted on the model by the air stream, said model holding means being movable tridimensionally.

11. An aerodynamic balance embodying in combination, a model holding member adapted to hold a model in an air stream, a floating support for said model holding member, and weighing means connected with said model holding member operating to measure the force exerted on the model by the air stream.

12. An aerodynamic balance embodying in combination, a model holding member adapted to hold a model in an air stream, means supporting said model holding member so as to permit rotational movement thereof around any of three axes at right angles to each other, and weighing means connected with said model holding member operating to measure the force exerted on the model by the air stream.

13. An aerodynamic balance embodying in combination, a model holding member adapted to hold a model in an air stream, means supporting said model holding member so as to permit both reciprocatory and rotational movements thereof, and weighing means connected with said model holding member operating to measure the force or moment exerted on the model by the air stream.

14. An aerodynamic balance embodying in combination, a model holding member adapted to hold a model in an air stream, freely movable means supporting said model holding member, means for leveling said freely movable means, and weighing means connected with said model holding member operating to measure the force exerted on the model by the air stream.

15. An aerodynamic balance embodying in combination, a model holding member adapted to hold a model in an air stream, means for altering the pose of the model while in the air stream, and weighing means connected with said model holding member operating to measure the force exerted on the model by the air stream.

16. An aerodynamic balance embodying in combination, a model holding member adapted to hold a model in an air stream, means for altering the pose of the model without interrupting the air stream, and weighing means connected with said model holding member operating to measure the force exerted on the model by the air stream.

17. An aerodynamic balance embodying movable model holding means, and a plurality of measuring devices connected to and operated by the movement of said holding means for accurately measuring, in three dimensions, the air forces and moments on a model in an air stream.

18. An aerodynamic balance embodying model holding means and adapted to set a model on said holding means at a definite angle in roll, pitch and yaw without interrupting the air stream in which the model is placed, said model holding means including setting means operable through the interior of said holding means.

19. An aerodynamic balance embodying model holding means, and means operated thereby to measure and indicate directly the drag, side drag and lift of a model situated in an air stream, and setting means operable through the interior of said holding means to set said model to a definite angle in roll, pitch and yaw without interrupting the air stream in which said model is placed.

20. An aerodynamic balance embodying movable model holding means and a plurality of measuring devices connected to and operated by the movement of the said holding means to measure directly and independently the drag, side drag and lift of a model situated in an air stream.

21. An aerodynamic balance embodying movably mounted model holding means, and measuring devices connected to and operated by the movement of said holding means to measure the rolling, pitching and yawing moments of a model situated in an air stream.

22. An aerodynamic balance embodying model holding means and means operated thereby to measure directly and independently the rolling, pitching and yawing moments of a model situated in an air stream, and setting means operable through the interior of said holding means to set said model to a definite angle in roll, pitch and yaw without interrupting the air stream in which said model is placed.

23. An aerodynamic balance embodying model holding means, recording means yieldably connected thereto to permit regulated oscillations of a model on said holding means in an air stream in roll, pitch and yaw for determining its damping coefficients.

24. An aerodynamic balance embodying in combination, a model holding member adapted to hold a model in an air stream, and weighing means connected with said model holding member operating to measure and indicate directly the force exerted on the model by the air stream, the connecting means between the model holding member and the weighing means comprising members nested one inside of another.

25. An aerodynamic balance embodying in combination, a model holding member adapted to hold a model in an air stream, and weighing means connected with said model holding member operating to measure and indicate directly the force exerted on the model by the air stream, the connecting means between the model holding member and the weighing means embodying tubular elements arranged in concentric and telescopic formation.

26. An aerodynamic balance embodying model holding means and means for setting a model on said holding means at different angles of orientation, and means operable through said holding means for measuring such angles in yaw, pitch and roll.

27. An aerodynamic balance embodying model holding means, and means operable therethrough for measuring the wrench on a model in any two of three directions at right angles to each other.

28. In an aerodynamic balance, a model supporting member, a weighing beam, a weight movable along the beam, and a weight-moving electric motor, the axis of which is constantly perpendicular to the path of the weight, the motor being fixed on the beam.

29. In an aerodynamic balance, a model supporting member, and means for obtaining relatively frictionless motion thereof, for translation and rotation or oscillation, said means embodying a freely movable mounting, and means for measuring the degree of force tending to motion in any of the three above designated directions.

In testimony whereof I have affixed my signature.

ALBERT F. ZAHM